Patented Aug. 29, 1950

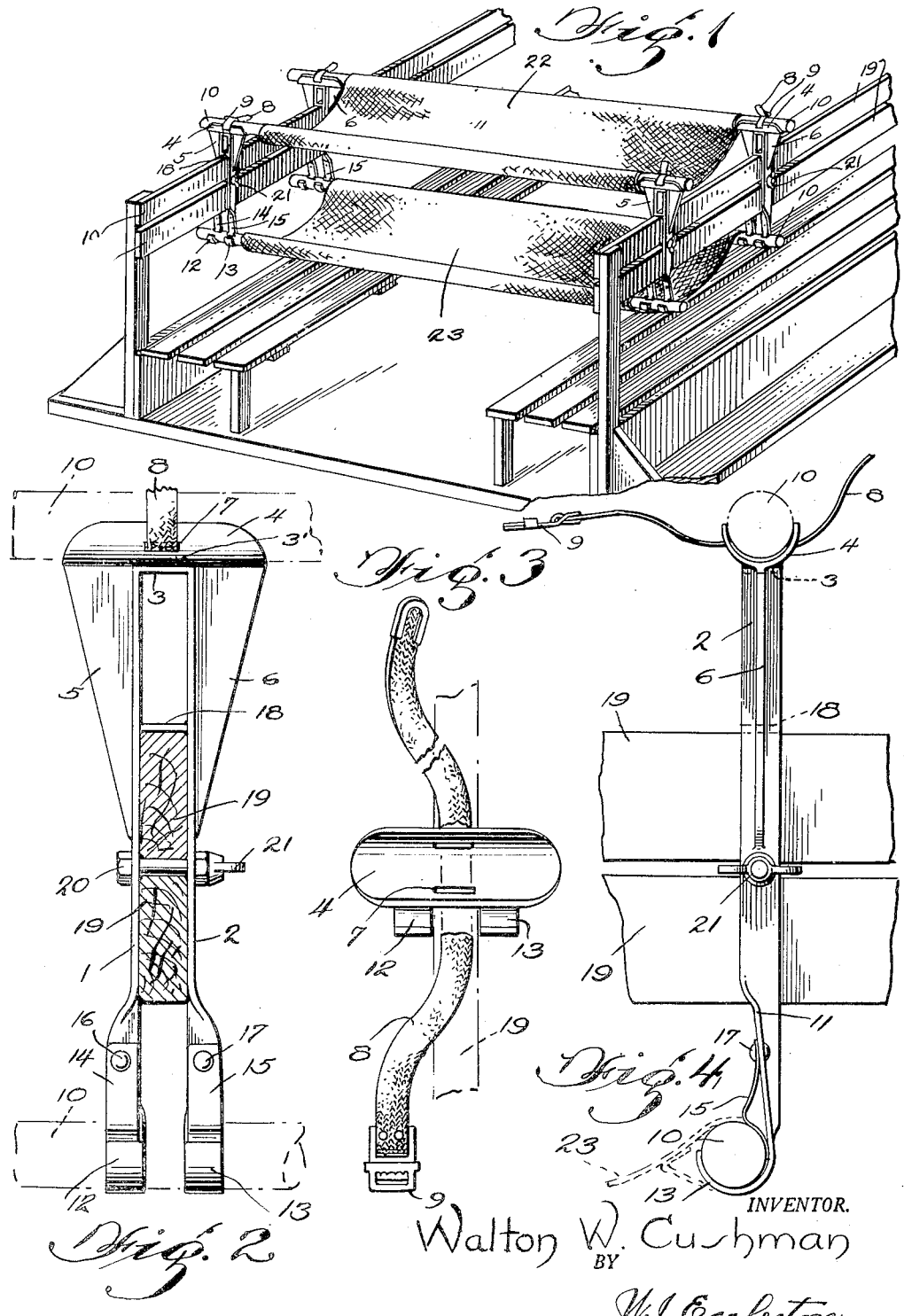

2,520,128

UNITED STATES PATENT OFFICE 2,520,128

LITTER RACK

Walton W. Cushman, Webb City, Mo.

Application December 6, 1945, Serial No. 633,251

4 Claims. (Cl. 296—19)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates to a litter rack, and more particularly, to a lightweight portable rack, a plurality of which are designed to be assembled on a vehicle for supporting litters in a compact arrangement one above the other.

Conditions of war make it necessary to transport the dead and/or the wounded in great numbers by vehicles. To facilitate this work, it is an object of this invention to provide a litter rack assembly of several racks, highly portable and of lightweight construction, to enable transporting the dead and/or the wounded in an orderly manner and in large numbers with a minimum number of transport vehicles.

Stretcher stands for vehicles have previously been suggested but the prior suggestions involve the use of complex and heavy frame structures which are unwieldy and too cumbersome to handle in a portable manner for transport by vehicles. It is therefore an object of this invention to provide a simple, lightweight, readily portable litter rack, a number of which may be fastened to the sides of a vehicle for supporting a number of litters extending across the vehicle one above the other.

Another object of this invention is to provide an improved litter rack assembly, comprised of a plurality of racks with litter supporting means at the top and bottom of each rack, so that four of such racks, suitably spaced, may be assembled to support two litters one above the other.

A further object of this invention is to provide an improved litter rack of simple, rigid, unitary construction and adapted to be fastened to a side of a vehicle and presenting a concave seat at its top and a hook at its bottom, each for receiving and supporting a litter handle.

It is still another object of this invention to provide a litter rack of inverted U-shape construction, a plurality of such racks being adapted to be suspended from the sides of a vehicle and each rack being designed to support a corner of each of two separate litters positioned one above the other.

Other objects and advantages of the present invention will appear from the following detailed description and from the drawing, wherein:

Figure 1 is an oblique view showing a number of the litter racks of this invention assembled on a vehicle to support a plurality of litters one above the other;

Figure 2 is a front elevational view of a litter rack of this invention showing the manner of fastening to a vehicle;

Figure 3 is a plan view of the litter rack; and

Figure 4 is a side elevational view of the litter rack in mounted position showing litter handles supported at the top and at the bottom of the rack.

Referring to the drawing, and more particularly to Figures 2, 3 and 4, the litter rack, which is made of steel or other suitable material, comprises an inverted U-shaped strap hanger having arms 1 and 2 depending from a body portion or cross piece 3. To the top of cross-piece 3 is welded as at 3', or otherwise suitably fixed, a concave seat 4 and to strengthen this structure, triangular web members 5 and 6, are welded, or otherwise suitably fixed, to the arms 1 and 2 and seat 4. The seat 4 is provided with a pair of oppositely disposed slots 7, through which passes a flexible strap 8 of conventional type having a buckle 9 for securely fastening against accidental displacement a litter handle 10 resting in the seat 4. The strap 8 may, however, be omitted.

The lower ends of arms 1 and 2 are twisted as at 11 and curved to form hooks 12 and 13, respectively. The pair of hooks 12 and 13 has the same axis and together they support a handle 10 of another litter disposed below the first litter. To hooks 12 and 13, spring clips 14 and 15 of conventional design are fastened at one end by rivets 16 and 17, respectively, for yieldably holding handle 10 securely in position in the combined hook 12, 13. The handle 10 is forced into position in hook 12, 13, the spring 14, 15 yielding for the purpose. If desired, however, the spring clips 14, 15 may be omitted.

The rack is provided with a stop member 18 welded in place between arms 1 and 2 and which forms an abutment to support the rack when the rack is placed in straddling position over the side of a vehicle. As illustrated in the drawing, the litter rack straddles side boards 19 of a vehicle and is carried by the top board 19 abutting against stop member 18. To hold the rack rigidly in mounted position, a bolt 20 is provided passing through the arms 1 and 2 and between two of the sideboards 19, the arms 1 and 2 being clamped tightly against the side boards by wing nut 21 on bolt 20.

Figure 1 illustrates the use of the racks of this invention as applied to a vehicle to support a number of litters one above the other in a compact and orderly relationship. The vehicle illustrated is a standard Army 2½ ton 6 x 6 truck but it is obvious that the racks can be mounted on any vehicle or boat having side members for supporting the racks and being of a width commensurate with the length of a litter. As illustrated in Figure 1, four racks are shown, two racks straddling each side of the vehicle. It is to be noted that the position of the stop 18 and the height of the top board 19 determines the height of the concave rest 4 and hooks 12, 13 above the floor of the vehicle. The two racks on one side of the vehicle are spaced apart a distance approximating the width of a litter. As seen in Figure 1 the litters 22 and 23 are superimposed one above the other, the top litter 22 having its handles 10 supported by the seats 4 of the four racks and the lower litter 23 having its handles 10 supported by the hooks 12, 13 of the four racks. Thus it is seen that four racks are needed to support two litters, each rack supporting a corner of each of two litters. It is to be noted that the sides of the vehicle are open in the region of the hooks 12, 13 to permit the handles 10 of the lower litter to protrude somewhat beyond the plane of the side wall and also to facilitate placing the lower litters on the racks. A large space for this purpose is shown in Figure 1 but only sufficient space to enable handles 10 to be inserted in hooks 12, 13 and protrude slightly beyond the wall is needed.

Figure 1 illustrates only one set of four racks but it is obvious that additional racks in multiples of four may be added along the length of the vehicle up to the capacity of the vehicle, only the length of the vehicle limiting the number of litters that can be carried. The height of the rack is selected so that there will be sufficient space between the upper and lower litters to permit a prone person or body to lie on each of the litters and provide sufficient clearance. These racks are especially designed for supporting litters for the dead although they may be used for supporting stretchers for the wounded. It is further to be noted from Figure 1 that sufficient space has been provided in the vehicle beneath the lower litter for carrying additional litters on the floor and on benches, seats or otherwise. Thus the rack of this invention will enable the ready transportation of large numbers of dead or wounded by vehicles in an orderly and efficient manner.

In operation, the racks are slipped over the sides of the vehicle in multiples of four and in proper spaced relationship. The litters are then placed on the racks, the forward positions being occupied first until the vehicle is filled to capacity. The wingnuts 21 are preferably tightened after the litters are in final position. In placing the racks, each set of four racks is positioned as closely as possible to the adjacent set of racks. If the opening in the side of the vehicle is large, as shown in Figure 1, the lower litters may be inserted in the vehicle from the side and then raised into position for engagement with hooks 12, 13.

While the invention has been described in more or less detail, it is not to be limited thereby, as changes may be made in the form, arrangement and construction of parts, and equivalents may be substituted, without departing from the spirit and the scope of the invention, as claimed, the form hereinbefore described being merely a preferred embodiment thereof.

I claim:

1. A rack for mounting on a vehicle, to aid in supporting litters, comprising a rigid, inverted, U-shaped member, having an upper body portion and a pair of depending arms, a concaved, elongated seat for a litter handle, fixed on said body portion and extending in the plane of the pair of arms, and a hook formed on the lower end of one of said arms and extending in a plane at right angles to the plane of the pair of arms.

2. A rack for mounting on a vehicle, to aid in supporting litters, comprising a rigid, inverted, U-shaped member, having an upper body portion and a pair of depending arms, a concaved, elongated seat for a litter handle, fixed on said body portion and extending in the plane of said pair of arms and protruding beyond the body portion of the U-shaped member, hooks formed on the lower ends of said arms and extending in planes at right angles to the plane of the pair of arms, and reinforcing means connecting one of said arms and a protruding portion of said concaved seat.

3. A rack assembly comprising four separate racks of like construction adapted to be fastened to vehicle side walls for supporting litters crosswise of the vehicle, each of said racks comprising an inverted U-shaped hanger having depending arms straddling the vehicle side wall, an upper seat at the top of said hanger for supporting a litter handle, a lower seat at the bottom of at least one of said arms for supporting another litter handle, and a stop member between said arms for engagement with the top of the vehicle side wall to present the upper seat above the vehicle side wall, whereby the four racks suitably spaced, two on each side of the vehicle, will support two litters, one above the other and crosswise of the vehicle, the upper litter being supported above the vehicle side walls.

4. A rack assembly for supporting litters comprising four separate racks of like construction adapted to be fastened to vehicle side walls having spaced horizontally extending sideboards, each of said racks comprising an inverted U-shaped hanger having depending arms straddling the vehicle side wall, an upper seat at the top of said hanger for supporting a litter handle, a lower seat formed at the bottom of each of said arms for together supporting another litter handle protruding outwardly from the vehicle side wall, and means extending through said arms and between a pair of the sideboards for clamping the rack to the side boards, whereby the four racks suitably spaced, two on each side of the vehicle, will support two litters, one above the other with litter handles protruding outwardly beyond the vehicle side walls.

WALTON W. CUSHMAN.

REFERENCES CITED

The following references are of record in the file of this patent:

UNITED STATES PATENTS

| Number | Name | Date |
| --- | --- | --- |
| 254,149 | Molt | Feb. 28, 1882 |
| 296,152 | Fair | Apr. 1, 1884 |
| 826,950 | MacIlwaine | July 24, 1906 |
| 1,520,543 | Meachen | Dec. 23, 1924 |
| 1,789,163 | Tintner | Jan. 13, 1931 |
| 2,276,236 | Latimer | Mar. 10, 1942 |
| 2,370,402 | Gutman | Feb. 27, 1945 |

FOREIGN PATENTS

| Number | Country | Date |
| --- | --- | --- |
| 7,547 | Great Britain | of 1915 |
| 153,773 | Switzerland | Apr. 15, 1932 |